(12) United States Patent
Iwasaki

(10) Patent No.: US 10,756,387 B2
(45) Date of Patent: Aug. 25, 2020

(54) METHOD OF PRODUCING SULFIDE SOLID ELECTROLYTE

(71) Applicant: TOYOTA JIDOSHA KABUSHIKI KAISHA, Toyota-shi, Aichi (JP)

(72) Inventor: Masahiro Iwasaki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/817,500

(22) Filed: Nov. 20, 2017

(65) Prior Publication Data

US 2018/0166742 A1 Jun. 14, 2018

(30) Foreign Application Priority Data

Dec. 9, 2016 (JP) ................... 2016-239143

(51) Int. Cl.
| | | |
|---|---|---|
| *H01M 10/0525* | (2010.01) | |
| *H01M 10/0562* | (2010.01) | |
| *C03B 32/02* | (2006.01) | |
| *C03C 3/32* | (2006.01) | |
| *H01M 10/052* | (2010.01) | |

(52) U.S. Cl.
CPC ......... *H01M 10/0562* (2013.01); *C03B 32/02* (2013.01); *C03C 3/323* (2013.01); *H01M 10/0525* (2013.01); *C03B 2201/86* (2013.01); *C03B 2201/88* (2013.01); *H01M 10/052* (2013.01); *H01M 2300/0068* (2013.01)

(58) Field of Classification Search
CPC ..... C03B 32/00; C03B 32/02; C03B 2201/86; C03B 2201/88; H01M 10/052; H01M 10/0525; H01M 10/0562; H01M 2300/0068
See application file for complete search history.

(56) References Cited

U.S. PATENT DOCUMENTS

| | | | |
|---|---|---|---|
| 2013/0040208 A1* | 2/2013 | Kanno | ..................... C01B 17/20 429/319 |
| 2016/0104917 A1* | 4/2016 | Sato | ........................ C01B 17/22 429/189 |

FOREIGN PATENT DOCUMENTS

| | | | |
|---|---|---|---|
| JP | 2009-093995 A | | 4/2009 |
| JP | 2010-030889 A | | 2/2010 |
| JP | 2010-163356 A | | 7/2010 |
| JP | 5527673 B2 | | 6/2014 |
| JP | 2015-179649 | * | 10/2015 |
| JP | 2015-179649 A | | 10/2015 |
| JP | 2016-207421 A | | 12/2016 |

* cited by examiner

*Primary Examiner* — Brittany L Raymond
(74) *Attorney, Agent, or Firm* — Oliff PLC

(57) ABSTRACT

Provided is a method of producing a sulfide solid electrolyte which brings low costs, and large sulfur reducing effect, the method comprising heat-treating material for a sulfide solid electrolyte at a temperature no less than a melting point of elemental sulfur while vibrating the material.

5 Claims, 2 Drawing Sheets

METHOD OF PRODUCING SULFIDE SOLID ELECTROLYTE

FIELD

The present application discloses a method of producing a sulfide solid electrolyte.

BACKGROUND

Metal-ion secondary batteries that have solid electrolyte layers using flame-retardant solid electrolytes (for example, a lithium-ion secondary battery. Hereinafter they may be referred to as "all-solid-state batteries".) have advantages such as an easy simplification of systems for securing safety.

Sulfide solid electrolytes of high Li-ion conductivity are known as solid electrolytes used for all-solid-state batteries. Examples of known sulfide solid electrolytes include $Li_2S$—$P_2S_5$ based electrolytes, $Li_2S$—$P_2S_5$—LiBr—LiI based electrolytes that are obtained by adding LiBr and LiI to $Li_2S$—$P_2S_5$ based electrolytes, and $Li_2S$—$P_2S_5$ based glass ceramics and $Li_2S$—$P_2S_5$—LiBr—LiI based glass ceramics which are glass ceramics thereof.

A problem with sulfide solid electrolytes is that elemental sulfur (hereinafter may be simply referred to as "elemental S") is easy to mix as an impurity. The following (1) to (4) are considered to be factors in mixing elemental S into sulfide solid electrolytes:

(1) Sulfide that is to be used as raw material for a sulfide solid electrolyte deteriorates while stored, and part thereof changes to an impurity (for example, $P_2S_5$ changes to $P_4S_9$ and $P_4S_7$). This impurity has a composition of fewer S atoms than sulfide before the change, and thus elemental S forms as a by-product;

(2) if raw material contains elemental S according to (1), this elemental S cannot be in contact with other kinds of raw material, which brings low reactivity, and many residues are left even after electrolytes are synthesized;

(3) elemental S forms while sulfide solid electrolytes are synthesized; and (4) S—S bonds form, to form elemental S in a heat-treating step for making sulfide solid electrolytes, glass ceramics.

For example, Patent Literature 1 discloses that capacity of a battery is prevented from decreasing, by 1 wt % or less of an elemental sulfur component in a sulfide solid electrolyte that is synthesized from at least $Li_2S$, and one or more sulfide(s) selected from $P_2S_3$, $P_2S_5$, $SiS_2$, $GeS_2$, $B_2S_3$, and $Al_2S_3$ as a technique of reducing an elemental sulfur component existing in a sulfide solid electrolyte, and discloses that raw material, or a sulfide solid electrolyte produced by raw material is washed with an organic solvent as a method of removing elemental sulfur.

Patent Literature 2 discloses that crystallinity of crystalline ion conductive material is decreased by mechanical milling, and the ion conductive material of decreased crystallinity is heated as a method of producing ion conductive material of a LGPS structure, and discloses vibrating milling as the mechanical milling.

CITATION LIST

Patent Literature

Patent Literature 1: JP2009-093995A
Patent Literature 2: JP5527673B

SUMMARY

Technical Problem

Patent Literature 1 describes that the amount of a residual elemental sulfur component in the washed sulfide solid electrolyte is 1 wt % or less. This amount of the residual elemental sulfur component is measured by: extracting a supernatant of the organic solvent with which the sulfide solid electrolyte was washed, and quantitating a supernatant that was further obtained by filtering the extracted supernatant through a Millipore filter using gas chromatography. Thus, some elemental S component that was not able to be caught by the organic solvent and is left in the sulfide solid electrolyte, or some elemental S component that was failed to be caught when the supernatant was extracted might not be able to be counted. Therefore, the actual amount of the residual elemental S component in the sulfide solid electrolyte is estimated to be more than the measurement amount in Patent Literature 1.

In addition, there is a problem that in the technique of Patent Literature 1, washing has to be carried out with a relatively expensive organic solvent such as toluene, which leads to rising costs.

An object of this disclosure is to provide a method of producing a sulfide solid electrolyte which brings low costs, and large sulfur reducing effect.

Solution to Problem

As a result of his intensive studies, the inventor of the present application found that the amount of residual elemental sulfur in a sulfide solid electrolyte can be reduced by heat-treating material for a sulfide solid electrolyte at a temperature no less than a melting point of elemental sulfur while vibrating the material.

In order to solve the above problems, the present disclosure takes the following means. That is:

the present disclosure is a method of producing a sulfide solid electrolyte, the method comprising: heat-treating material for a sulfide solid electrolyte at a temperature no less than a melting point of elemental sulfur while vibrating the material.

In this disclosure, preferably, said heat-treating is carried out under a reduced pressure or in the presence of a gas flow.

In this disclosure, preferably, the raw material for an electrolyte is synthesized from at least $Li_2S$, and one or more sulfide(s) selected from $P_2S_3$, $P_2S_5$, $SiS_2$, $GeS_2$, $B_2S_3$ and $Al_2S_3$.

In this disclosure, preferably, the raw material for an electrolyte contains at least $Li_2S$ and $P_2S_5$.

In this disclosure, preferably, prior to said heat-treating while vibrating, pulverizing the material for a sulfide solid electrolyte is included.

In this disclosure, preferably, in said heat-treating while vibrating, the material for a sulfide solid electrolyte is heated at a temperature no less than a crystallization temperature of the material for a sulfide solid electrolyte, to obtain a sulfide solid electrolytes of glass ceramics.

Advantageous Effects

According to the present disclosure, a method of producing a sulfide solid electrolyte which brings low costs, and large sulfur reducing effect can be provided.

DETAILED DESCRIPTION OF EMBODIMENTS

Hereinafter the present disclosure will be described. The embodiments below are examples of the present disclosure. The present disclosure is not restricted to the following embodiments. Expression "A to B" concerning numeral values A and B means "no less than A and no more than B" unless otherwise specified. In such expression, if a unit is added only to the numeral value B, the same unit is applied to the numeral value A as well.

Figure 1:
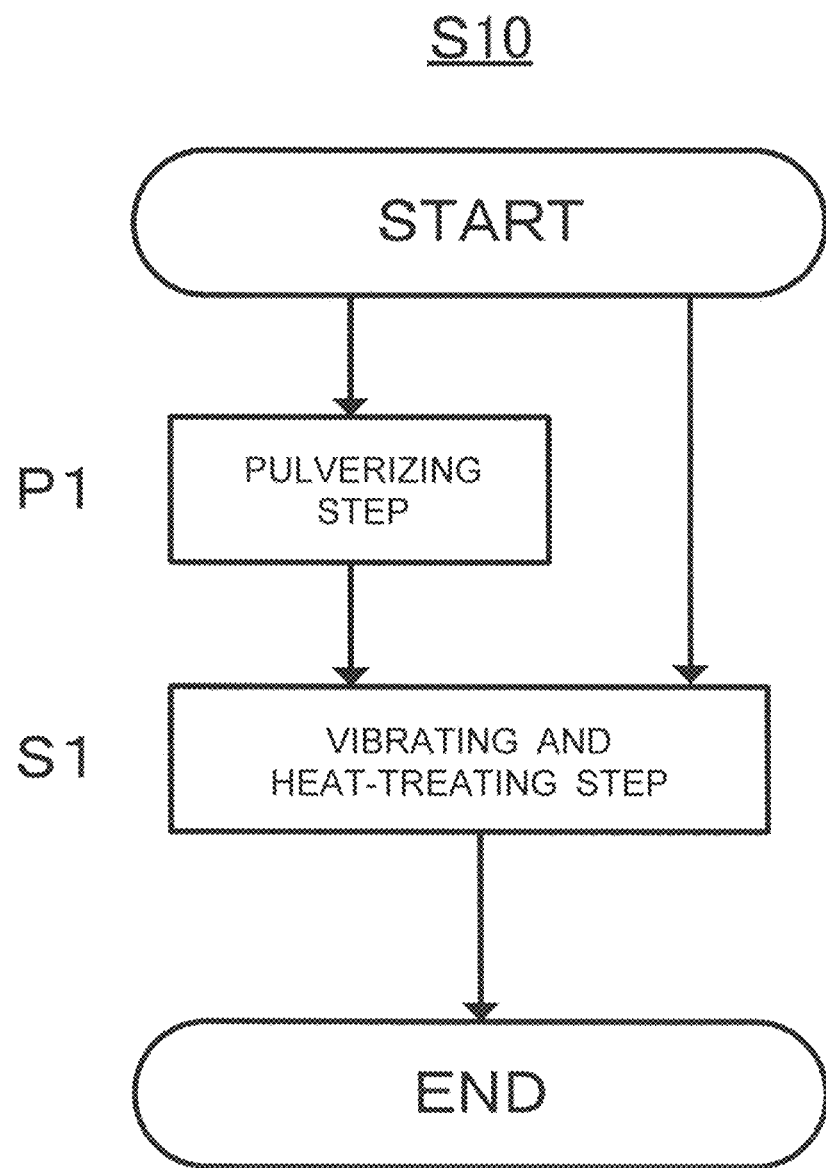
FIG. 1 is a flowchart showing a producing method S10 according to one embodiment of this disclosure.

FIG. 1 is a flowchart showing a producing method (S10) according to one embodiment of this disclosure. The producing method (S10) shown in FIG. 1 includes a vibrating and heat-treating step (S1). The producing method (S10) preferably includes an pulverizing step (P1) prior to the vibrating and heat-treating step (S1).

Hereinafter each step included in the producing method according to one embodiment of the present disclosure (hereinafter may be simply referred to as "S10") will be described.

1. Vibrating and Heat-Treating Step (S1)

The vibrating and heat-treating step (hereinafter may be simply referred to as "S1") is a step of heat-treating material for a sulfide solid electrolyte at a temperature no less than a melting point of elemental sulfur while vibrating the material.

1.1 Material for Sulfide Solid Electrolyte

Material for a sulfide solid electrolyte used in this disclosure is preferably synthesized from the following raw material for an electrolyte.

(Raw Material for Electrolyte)

Raw material for an electrolyte is not restricted as long as it can be raw material for the material for a sulfide solid electrolyte. This raw material preferably contains at least $Li_2S$, and one or more sulfide(s) selected from $P_2S_3$, $P_2S_5$, $SiS_2$, $GeS_2$, $B_2S_3$ and $Al_2S_3$, and more preferably contains at least $Li_2S$ and $P_2S_5$. The raw material for an electrolyte may contain other components in addition to the above described sulfides. Examples of the other components include LiX (X is a halogen) described later, and $Li_2O$.

The proportion of $Li_2S$ to the sum of $Li_2S$ and $P_2S_5$ in the embodiment that the raw material for an electrolyte contains at least $Li_2S$ and $P_2S_5$ is not restricted. For example, the proportion is preferably within the range of 70 mol % to 80 mol %, more preferably within the range of 72 mol % to 78 mol %, and further preferably within the range of 74 mol % to 76 mol %. This is because the sulfide solid electrolyte can have an ortho composition or a composition close thereto, and can have high chemical stability with this proportion. Here, "ortho" generally means the most hydrated oxoacid among oxoacids that can be obtained by hydrating one oxide. In the present disclosure, a crystal composition to which $Li_2S$ is added most among sulfides is referred to as an ortho composition. In a $Li_2S$—$P_2S_5$ based electrolyte, $Li_3PS_4$ falls under an ortho composition. In the case of the $Li_2S$—$P_2S_5$ based sulfide solid electrolyte, the ratio of $Li_2S$ and $P_2S_5$ to obtain an ortho composition is $Li_2S:P_2S_5=75:25$ on a molar basis.

Preferably, the raw material for an electrolyte further contains LiX (X is a halogen) in view of obtaining the sulfide solid electrolyte of high Li-ion conductivity. This is because the sulfide solid electrolyte of high Li-ion conductivity can be obtained. Specifically, X can be F, Cl, Br or I. Among them, Br or I is preferable. The proportion of LiX contained in the raw material for an electrolyte is not restricted. For example, the proportion is preferably within the range of 1 mol % to 60 mol %, more preferably within the range of 5 mol % to 50 mol %, and further preferably within the range of 10 mol % to 30 mol %.

(Synthesizing Method)

A method of synthesizing the material for a sulfide solid electrolyte from the raw material for an electrolyte is not restricted. For example, the raw material for an electrolyte can be amorphized according to a mechanical milling (wet or dry) method, or melt extraction, to synthesize the material for a sulfide solid electrolyte. Among them, a mechanical milling method is preferable in view of easy reduction in manufacturing costs because of processability at room temperature, and the like. Either a wet or dry mechanical milling method may be used. A wet mechanical milling method can be applied by loading liquid along with the raw material for an electrolyte into a vessel of a ball mill or the like.

A mechanical milling method is not restricted as long as the method is to amorphize the raw material for an electrolyte while applying mechanical energy thereto. Examples of this method include ball milling, vibrating milling, turbo milling, a mechanofusion method and disk milling. Among them, ball milling is preferable, and planetary ball milling is especially preferable. This is because desired material for a sulfide solid electrolyte can be efficiently obtained.

Various conditions for a mechanical milling method are set so that the raw material for an electrolyte can be amorphized and the material for a sulfide solid electrolyte can be obtained. For example, in the case of using a planetary ball mill, the raw material for an electrolyte, and grinding balls are loaded into a vessel, and a process is carried out at a predetermined rotation speed for predetermined time. In general, the higher the rotation speed is, the higher the speed at which the material for a sulfide solid electrolyte forms; and the longer the processing time is, the higher the conversion ratio into the material for a sulfide solid electrolyte is. The disk rotation speed when planetary ball milling is carried out is, for example, within the range of 200 rpm to 500 rpm, and preferably within the range of 250 rpm to 400 rpm. The processing time when planetary ball milling is carried out is, for example, within the range of 1 hour to 100 hours, and preferably within the range of 1 hour to 50 hours. Examples of material for a vessel and grinding balls used for ball milling include $ZrO_2$ and $Al_2O_3$. The diameter of each grinding ball is, for example, within the range of 1 mm to 20 mm.

1.2. Vibrating and Heat-Treating

In S1, the material for a sulfide solid electrolyte is heat-treated at a temperature no less than a melting point of elemental sulfur while the material is vibrated, whereby most of elemental S contained in the material for a sulfide solid electrolyte is removed, and the amount of residual elemental S in the sulfide solid electrolyte can be reduced more than cases using conventional methods.

Mechanisms therefor are considered the following (1) to (3):

(1) the elemental S contained in the material for a sulfide solid electrolyte is molten by heating the material for a sulfide solid electrolyte at a temperature equal to or over the melting point of the elemental S, which leads to efflux of the elemental S on the surface of the material for a sulfide solid electrolyte;

(2) liquid elemental S that is the efflux on the surface of the material for a sulfide solid electrolyte in (1) volatilizes from the surface of the material for a sulfide solid electrolyte; and (3) the material for a sulfide solid electrolyte fluidizes by being vibrated, and the surface thereof is always exchanged, which promotes volatilization of the elemental S in (2).

A method of vibrating the material for a sulfide solid electrolyte in S1 is not restricted as long as the material for a sulfide solid electrolyte can fluidize by being vibrated, and the surface thereof can be always exchanged as described in the above mechanism (3). For example, this method can be carried out using a vibrating and heat-treating device or the like. When a vibrating and heat-treating device is used, vibration conditions are not restricted. For example, a vibration frequency is preferably 10 to 1000 Hz, and amplitude is preferably 1 to 10 mm. The method of vibrating the material for a sulfide solid electrolyte is not limited to this. For example, the method can be carried out by rotating a vessel into which the material for a sulfide solid electrolyte is loaded, or by directly stirring the material for a sulfide solid electrolyte that is loaded into a vessel, according to a known means.

In view of promoting volatilization of the elemental S described in the mechanisms (2) and (3), vibrating and heat-treating in S1 is preferably carried out under a reduced pressure of an inert gas or in the presence of a gas flow. Examples of an inert gas include an Ar gas, a He gas and a $N_2$ gas. In the embodiment of carrying out S1 under a reduced pressure, pressure in the system is not restricted. In the embodiment of carrying out S1 in the presence of a gas flow, the flow rate of gas to flow is not restricted. For example, the flow rate is preferably 0.1 ml/min to 5000 ml/min.

Heating in S2 is necessary to be carried out at a temperature equal to or over the melting point of the elemental S in order that, as described in the mechanism (1), the elemental S contained in the material for a sulfide solid electrolyte is molten, to lead to efflux of the elemental S on the surface of the material for a sulfide solid electrolyte; and also in order that, as described in the mechanism (2), the liquid elemental S that is the efflux volatilizes from the surface of the material for a sulfide solid electrolyte.

"Melting point of elemental sulfur" in this disclosure means the melting point of the elemental S contained in the material for a sulfide solid electrolyte. When a plurality of allotropes of the elemental S which have different melting points are contained therein, "melting point of elemental sulfur" means the lowest melting point among these allotropes. There exist no less than 30 allotropes of elemental sulfur. Cyclo-$S_8$ is generally known as elemental sulfur having a melting point. There exist three crystal forms of $S_8$, which are α-sulfur (orthorhombic sulfur, melting point: 112.8° C.), β-sulfur (monoclinic sulfur, melting point: 119.6° C.) and γ-sulfur (monoclinic sulfur, 106.8° C.). Allotropes of the elemental S contained in the material for a sulfide solid electrolyte are considered to vary depending on the composition of the material for a sulfide solid electrolyte. When a plurality of allotropes of the elemental S which have different melting points are contained therein, a heating temperature in S1 is set at a temperature of at least the lowest melting point among the contained allotropes, or over. More preferably, the heating temperature in S1 is set at a temperature of the highest melting point among the contained allotropes, or over because the amount of S can be reduced more. When it is not certain what allotropes of the elemental S are contained therein, S1 is carried out at a temperature of the melting point of an allotrope that has the highest possibility of being contained therein, or over, that is, at a temperature of the melting point of β-sulfur (119.6° C.), or over, which makes it possible to surely obtain the effect of the present application.

In S1, the material for a sulfide solid electrolyte can be crystallized, and the sulfide solid electrolyte of glass ceramics can be obtained by heating at a temperature equal to or over the melting point of the elemental sulfur, and equal to or over a crystallization temperature of the material for a sulfide solid electrolyte. Generally, the crystallization temperature of material for a sulfide solid electrolyte is higher than the melting point of elemental sulfur. Thus, in S1, the amorphous sulfide solid electrolyte can be obtained after S1 by heating at a temperature equal to or over the melting point of the elemental sulfur, and lower than the crystallization temperature of the material for a sulfide solid electrolyte, and the sulfide solid electrolyte of glass ceramics can be obtained by heating at a temperature equal to or over the crystallization temperature of the material for a sulfide solid electrolyte. Whether the sulfide solid electrolyte is glass ceramics or not can be confirmed by X-ray diffraction analysis, for example.

The crystallization temperature of the material for a sulfide solid electrolyte can be determined by differential thermal analysis (DTA). The crystallization temperature of the material for a sulfide solid electrolyte varies according to the composition of the material for a sulfide solid electrolyte. For example, this temperature is within the range of 130° C. to 250° C.

The upper limit of the temperature in heating in S1 is not restricted. If the temperature in heating is too high, a crystalline phase of low Li-ion conductivity (referred to as a low Li-ion conductive phase) forms in the sulfide solid electrolyte of glass ceramics. Thus, heating is preferably carried out at a temperature lower than a formation temperature of a low Li-ion conductive phase. The formation temperature of a low Li-ion conductive phase can be identified by X-ray diffractometry using CuKα. The formation temperature of a low Li-ion conductive phase varies depending on the composition of the material for a sulfide solid electrolyte. For example, this temperature is within the range of 230 to 500° C.

Time for heating in S1 is not restricted as long as the amount of the residual elemental sulfur can be reduced. For example, this time is preferably no less than 5 minutes and no more than 5 hours, and more preferably no less than 10 minutes and no more than 4.5 hours. A method of heating is not restricted. Examples of this method include a method using a firing furnace.

In S1, the time for heating necessary for reducing the amount of the residual elemental S is time enough for amorphizing the material for a sulfide solid electrolyte. Thus, in S1, the sulfide solid electrolyte of glass ceramics can be obtained by heating the material for a sulfide solid electrolyte at a temperature equal to or over the crystallization temperature of the material for a sulfide solid electrolyte.

According to this disclosure, the amount of the residual elemental S in the sulfide solid electrolyte can be reduced only by vibrating and heat-treating the material for a sulfide solid electrolyte. Thus, the amount of the residual elemental S can be reduced with the simple step. In addition, this disclosure makes it possible to reduce the amount of the elemental S without using a relatively expensive organic solvent such as toluene as the technique of Patent Literature 1, which is superior in costs.

In the present disclosure, if the sulfide solid electrolyte of glass ceramics is desired to be obtained, the material for a sulfide solid electrolyte can be crystallized at the same time as removal of the elemental S by heating in S1 at a temperature equal to or over the crystallization temperature of the material for a sulfide solid electrolyte. Thus, it is not necessary to carry out a step of crystallizing the material for a sulfide solid electrolyte separately. Therefore, the sulfide solid electrolyte of glass ceramics where the amount of the residual elemental sulfur is reduced can be produced with the extremely simple step.

The sulfide solid electrolyte of glass ceramics may be obtained by further heating at a temperature equal to or over the crystallization temperature of the material for a sulfide solid electrolyte after carrying out S1 at a temperature equal to or over the melting point of the elemental S, and lower than the crystallization temperature of the material for a sulfide solid electrolyte. For example, such an embodiment may be achieved that a temperature of heating is changed in the middle of S1, as the embodiment that the former half of S1 is carried out at a temperature equal to or over the melting point of the elemental sulfur, and lower than the crystallization temperature of the material for a sulfide solid electrolyte, and the latter half thereof is carried out at a temperature equal to or over a temperature lower than the crystallization temperature of the material for a sulfide solid electrolyte.

2. Pulverizing Step (P1)

S10 preferably includes an pulverizing step of pulverizing the material for a sulfide solid electrolyte (hereinafter may be simply referred to as "P1") prior to S1.

According to the embodiment of including P1, an pulverized sulfide solid electrolyte can be obtained, which makes it possible to reduce reaction resistance of an all-solid-state battery using the pulverized sulfide solid electrolyte. Pulverizing the material for a sulfide solid electrolyte makes it possible for the material to be subjected to S1 after fluidity is improved, and a specific surface is enlarged. Thus, the effect of removing the elemental S in S1 can be improved. Therefore, the amount of the residual elemental S in the sulfide solid electrolyte can be reduced more.

In P1, a method of pulverizing the material for a sulfide solid electrolyte is not restricted, and a known method can be employed. For example, the material for a sulfide solid electrolyte can be pulverized by media grinding such as bead milling and ball milling, jet grinding, and cavitation grinding. Pulverizing conditions (grinding conditions) are set so that the material for a sulfide solid electrolyte can be ground to have a desired particle size. For example, when a planetary ball mill is used, the material for a sulfide solid electrolyte, a solvent, an additive, and grinding balls are loaded, to carry out a grinding process at a predetermined rotation speed for predetermined time. When a planetary ball mill is used, the diameter of a grinding ball ($\varphi$) in P1 is not restricted. The diameter of a grinding ball can be no less than 0.05 mm, and is preferably no less than 0.1 mm in view of easy handling of the grinding balls, and so on. A material of the grinding balls is not restricted as long as the sulfide solid electrolyte containing few impurity is obtained. Examples of the material include $ZrO_2$, and $Al_2O_3$. The diameter of a grinding ball can be no more than 5 mm, and is preferably no more than 1 mm, in view of achieving the embodiment of easily grinding the material for a sulfide solid electrolyte to have a desired particular size. For example, the disk rotation speed when planetary ball milling is carried out is preferably 100 rpm to 400 rpm, and more preferably 150 rpm to 300 rpm. For example, the processing time when planetary ball milling is carried out can be 1 hour to 100 hours.

In the producing method of this disclosure, P1 is preferably a wet media grinding process in view of achieving the embodiment of easily obtaining the pulverized sulfide solid electrolyte. The total grinding energy E per unit weight of the material for a sulfide solid electrolyte in a wet media grinding process, which is defined by the following formula (1), is preferably 50 kJ·sec/g to 4000 kJ·sec/g, more preferably 400 kJ·sec/g to 2000 kJ·sec/g, and especially preferably 450 kJ·sec/g to 2000 kJ·sec/g:

$$E = \tfrac{1}{2} nmv^2/s \cdot t \qquad \text{Formula (1)}$$

where n is the number of the media, m is the weight per medium (kg), v is the velocity of the media (m/s), s is the amount of the material for a sulfide solid electrolyte (g), and t is the processing time (sec). The formula (1) represents the total grinding energy assuming that all the kinetic energy of the media (for example, beads and balls) is used for grinding the material for a sulfide solid electrolyte.

The velocity of the media v can be suitably calculated according to a type of the media grinding process. For example, in the case of planetary ball milling, the velocity of the media v can be calculated by the following formula (2):

$$v = d\pi R\alpha/1000/60 \qquad \text{Formula (2)}$$

where d is the diameter (mm) of the pot (vessel), R is the disk rotation speed (rpm), and $\alpha$ is the rotation-revolution ratio.

On the other hand, when cavitation grinding is carried out as the grinding process, the rotation speed is, for example, preferably 1000 rpm to 3000 rpm. Also, the flow rate is, for example, preferably 1.0 g/min to 3.0 g/min.

Further, in the producing method of the present disclosure, the proportion X of the mass of the material for a sulfide solid electrolyte to the total mass of the solvent, the additive, and the material for a sulfide solid electrolyte used for a wet media grinding process is preferably $0.1 \leq X \leq 0.35$ in view of obtaining the embodiment of easily improving the ion conductivity of the particulate sulfide solid electrolyte, and so on. When P1 is a wet media grinding process, a solvent similar to that usable when the material for a sulfide solid electrolyte is synthesized in S1 can be used in P1. An additive (examples thereof include compounds that can prevent the material for a sulfide solid electrolyte from adhering or granulating, such as ether compounds, ester compounds, and nitrile compounds) is added to a vessel which the above solvent is in, and further, the material for a sulfide solid electrolyte prepared in S1 and the media are loaded thereto. After that, they can be subjected to a wet media grinding process. The above solvent preferably contains few amounts of moisture because the embodiment of easily suppressing formation of hydrogen sulfide (deterioration of the sulfide solid electrolyte) is achieved.

The mean particle size ($D_{50}$) of particulate material for a sulfide solid electrolyte that is obtained after P1 is not restricted. For example, $D_{50}$ is preferably 0.1 μm to 5 μm, and more preferably 0.5 μm to 4 μm. Here, examples that can be employed as the mean particle size ($D_{50}$) include a median diameter equivalent to cumulative 50 volume % on the particle side in the particle diameter distribution on the basis of volume, which is measured using a particle size distribution measurement instrument based on a laser diffraction and scattering method.

EXAMPLES

Synthesizing Sulfide Solid Electrolyte

Example 1

(Synthesizing Step)

The following were used as raw material for an electrolyte: lithium sulfide ($Li_2S$ manufactured by Nippon Chemical Industrial Co., Ltd, 99.9% purity. Hereinafter the same was used), phosphorus pentasulfide ($P_2S_5$ manufactured by Aldrich, 99.9% purity. Hereinafter the same was used), lithium bromide (LiBr manufactured by Kojundo Chemical Laboratory Co., Ltd., 99.9% purity. Hereinafter the same was used) and lithium iodide (LiI manufactured by Aldrich, 99.9% purity. Hereinafter the same was used). This raw material for an electrolyte was weighed so as to have the molar ratio of $Li_2S:P_2S_5:LiBr:LiI=56.25:18.75:15:10$. Into a vessel of a planetary ball mill (45 ml, made from $ZrO_2$), the weighed raw material for an electrolyte along with toridecane, and further balls made from $ZrO_2$, having 5 mm in diameter, were loaded, and the vessel was completely sealed hermetically. The raw material for an electrolyte was amorphized by mechanical milling at 290 rpm for 20 hours, and material for a sulfide solid electrolyte ($75(0.75Li_2S.0.25P_2S_5).15LiBr.10LiI$) was synthesized. After mechanical milling was ended, $75(0.75Li_2S.0.25P_2S_5).15LiBr.10LiI$ was collected from the vessel, and was subjected to vacuum drying at 80° C., to remove tridecane, whereby the material for a sulfide solid electrolyte of $75(0.75Li_2S.0.25P_2S_5).15LiBr.10LiI$ was obtained.

(Pulverizing Step)

The following were loaded into a pot made from $ZrO_2$: 75 g of the material for a sulfide solid electrolyte collected from the vessel after the synthesizing step; 120 g of dehydrated heptane (manufactured by Kishida Chemical Co., Ltd.); 80 g of dehydrated n-butyl ether (manufactured by Kishida Chemical Co., Ltd.); and 400 g of grinding media made from $ZrO_2$ (particle diameter Φ: 0.3 mm); and the pot was completely sealed hermetically (Ar atmosphere). This pot was attached to a planetary ball mill (P-5 manufactured by FRITSCH), and wet mechanical milling was carried out at 150 rpm for 22 hours, to pulverize the material for a sulfide solid electrolyte.

(Drying Step)

Slurry of the material for a sulfide solid electrolyte that was obtained by separating the grinding media from the pulverized material was dried on a hot plate at 120° C. in setting temperature for 3 hours, to obtain the material for a sulfide solid electrolyte of 0.5 μm in mean particle size ($D_{50}$). Here, as the mean particle size ($D_{50}$), employed was a median diameter equivalent to cumulative 50 volume % on the particle side in the particle diameter distribution on the basis of volume, which was measured using a particle size distribution measurement instrument by laser scattering and diffraction analysis (Microtrac MT 3300EX II manufactured by Nikkiso Co., Ltd.).

(Vibrating and Heat-Treating Step)

Into a vibrating and heat-treating device (vibrating and drying machine VU-15 manufactured by Chuo Kakohki Co., Ltd.), 300 g of the dried material for a sulfide solid electrolyte was loaded, and was subjected to heat-treating at 200° C. in setting temperature for 3 hours while being fluidized by vibration (frequency: 25 Hz, amplitude: 3 mm) under a reduced pressure at 0.6 kPa, to obtain the sulfide solid electrolyte according to the example 1.

Example 2

A sulfide solid electrolyte according to the example 2 was obtained in the same way as the example 1 except that $N_2$ gas was circulated in the vibrating and heat-treating step at 5 L/min under atmospheric pressure.

Comparative Example 1

A sulfide solid electrolyte according to the comparative example 1 was obtained in the same way as the example 1 except that 300 g of the material for a sulfide solid electrolyte was not loaded into the vibrating and heat-treating device, but loaded into a hermetically sealable vessel, to stand still.

[Analysis]

<Analysis of Amount of Residual Elemental S (TPD-MS)>

Figure 2:
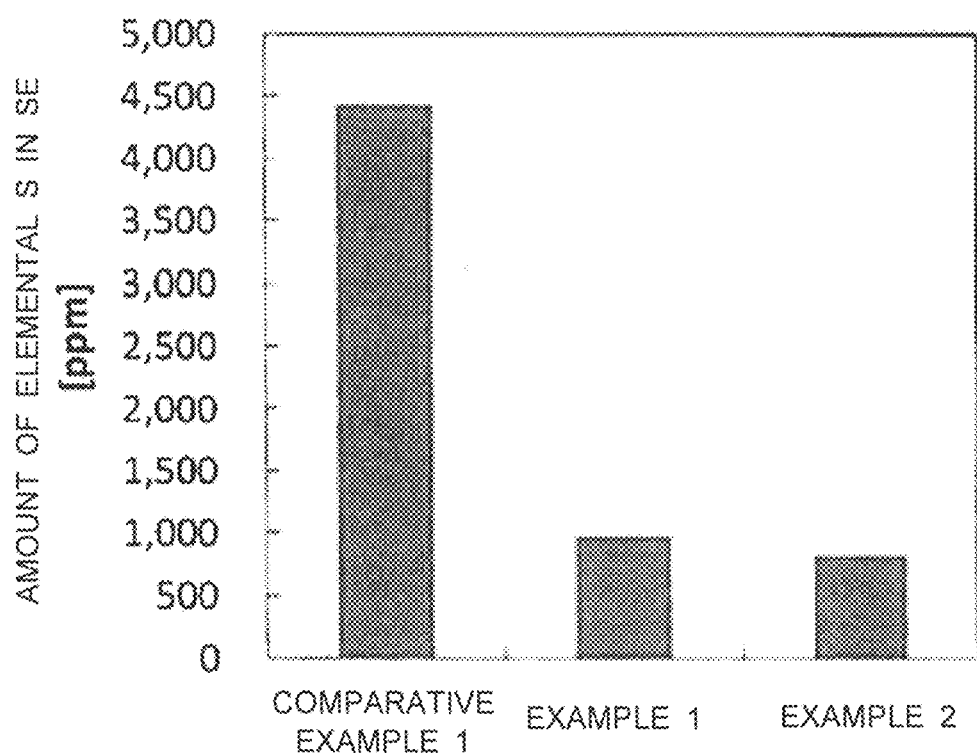
FIG. 2 shows the measurement results of the amounts of elemental S contained in the sulfide solid electrolytes according to the examples 1, 2, and comparative example 1.

The amounts of residual elemental S in the sulfide solid electrolytes made in the examples 1, 2 and comparative example 1 were measured according to TPD-MS. A device and measurement conditions used were as follows. The results are shown in Table 1 and FIG. 2.

GC/MS QP5050A(4) manufactured by Shimadzu Corporation heating rate: 10° C./min
temperature: 25 to 500° C.
dilute gas: He by 50 mL/min

TABLE 1

Measurement Result of Amount of Elemental S

| | Amount of Elemental S [ppmw] |
|---|---|
| Example 1 | 965 |
| Example 2 | 823 |
| Comparative Example 1 | 4443 |

[Result]

As shown in Table 1, the amounts of elemental S in the sulfide solid electrolytes according to the examples 1 and 2 were reduced more than that according to the comparative example 1. It is considered that in each of the example 1 and 2, the surface of the material for a sulfide solid electrolyte, which was a zone where molten elemental S easily volatilized, was always exchanged by vibrating the material for a sulfide solid electrolyte, and heat-treating the material while fluidizing the material, which made it possible to reduce the amount of the elemental S more than the comparative example 1.

Reference Experiment Showing Influence of Elemental S in Sulfide Solid Electrolyte on Retention Capacity of Battery

Reference Example 1

After the drying step of the example 1, the following gas flow heating step was carried out, to obtain a sulfide solid electrolyte according to the reference example 1.

(Gas Flow Heating Step)

Into a two-neck round-bottom flask, 15 g of the dried material for a sulfide solid electrolyte was loaded, and heated in an oil bath at 200° C. for 3 hours while circulating gas (gas mixture of $H_2S$: 150 mL/min, and Ar: 150 mL/min).

Reference Example 2

A sulfide solid electrolyte according to the reference example 2 was obtained in the same way as the reference example 1 except that the following reduced pressure heating step was carried out instead of the gas flow heating step of the reference example 1.

(Reduced Pressure Heating Step)

Into a hermetically sealable vessel, 15 g of the dried material for a sulfide solid electrolyte was loaded, and heated in an oil bath at 200° C. for 3 hours under a reduced pressure at 500 Pa.

[Analysis]

<Analysis of Amount of Residual Elemental S (TPD-MS)>

The amounts of residual elemental S in the sulfide solid electrolytes made in the reference examples 1 and 2 were measured according to TPD-MS in the same way as the above. The results are shown in Table 2.

<Battery Life Evaluation (Pressed-Powder Coin Battery)>

(Making Battery)

A pressed-powder coin battery (all-solid-state battery) was made as follows, to evaluate the battery. The sulfide solid electrolyte according to the reference example 2 was used for a cathode mixture layer and an anode mixture layer.

Prepared were: composite particle formed by covering $LiNi_{1/3}Co_{1/3}Mn_{1/3}O_2$ particle (active material particle) with $LiNbO_3$ (oxide based solid electrolyte) as a cathode active material, the sulfide solid electrolyte according to either the reference example 1 or 2 as the sulfide solid electrolyte, a vapor-grown carbon fiber (VGCF) as conductive material, and PVdF as a binding agent. These cathode active material, sulfide solid electrolyte, conductive material (VGCF), and binding agent (PVdF) were mixed so that the cathode active material:the sulfide solid electrolyte:the conductive material:the binding agent=84.0 weight %:13.4 weight %:1.3 weight %:1.3 weight %, to prepare a cathode mixture.

Material for a sulfide solid electrolyte of $75(0.75Li_2S.0.25P_2S_5).15LiBr.10LiI$ particle was prepared as material for a separator layer (solid electrolyte layer).

Prepared were: natural graphite as an anode active material, the sulfide solid electrolyte according to either the reference example 1 or 2 as the sulfide solid electrolyte, and PVdF as a binding agent. These anode active material, sulfide solid electrolyte, and binding agent (PVdF) were mixed so that the anode active material:the sulfide solid electrolyte:the binding agent=54.3 weight %:44.9 weight %:0.8 weight %, to prepare an anode mixture.

First, a powder compact of the $75(0.75Li_2S.0.25P_2S_5).15LiBr.10LiI$ particle, which was material for a solid electrolyte layer, was formed. Next, the cathode mixture was arranged on one face of the powder compact, and the anode mixture was arranged on the other face of the powder compact. The powder compact was subjected to planer pressing at 6 ton/$cm^2$ in pressure for 1 minute in pressing time, to obtain a laminated body. In the laminated body obtained at that time, the thickness of the cathode mixture layer was 41 μm the thickness of the anode mixture layer was 53 μm, and the thickness of the separator layer was 15 μm. The laminated body was constrained at 15 MPa in pressure in the laminating direction, to make a pressed-powder coin battery.

<Battery Evaluation: Measurement of Capacity Retention>

A process of detaching lithium ions from the cathode (release) was defined as "charging", and a process of intercalating lithium ions into the cathode (occlusion) was defined as "discharging". A charge-discharge test was done using a charge-discharge testing device (HJ-1001 SMSA manufactured by Hokuto Denko Corporation). Charging and discharging were repeated at ⅓ C (0.615 mA) in current flow at 25° C. in temperature within the range of 3 V (discharging) to 4.37 V (charging). Discharge capacity at the third cycle was regarded as the initial capacity. After that, after the battery had been stored for 28 days at 60° C. in temperature at 4.1 V in charge potential, discharge capacity after stored was measured in the same way as the initial capacity, and the ratio of the capacity after stored to the initial capacity was regarded as the capacity retention. The results are shown in Table 2.

(capacity retention)=(CC discharge capacity after stored)/(initial CC discharge capacity)×100(%)

TABLE 2

| | Measurement Result of Amount of Elemental S and Capacity Retention | |
|---|---|---|
| | Amount of Elemental S [ppmw] | Capacity Retention [%] |
| Reference Example 1 | 188 | 94.3 |
| Reference Example 2 | 1149 | 92.9 |

[Result]

As shown in Table 2, the amount of the elemental S of the sulfide solid electrolyte according to the reference example 1 was largely reduced compared to the sulfide solid electrolyte according to the reference example 2, and the capacity retention in the reference example 1 was improved. Elemental S contained in sulfide solid electrolyte is considered to react with anode active material in a charging state. It is considered that in the reference example 1, the amount of the elemental S contained in the sulfide solid electrolyte was reduced more than that of the reference example 2, whereby reaction of the elemental S and the anode active material was suppressed, and the capacity retention of the all-solid-state battery was improved. From the results, it is considered that the capacity retentions can be improved by reducing elemental S contained in a sulfide solid electrolyte.

From the above results, it is assumed that the capacity retention of the all-solid-state battery using the sulfide solid electrolyte according to any example 1 and 2 was improved compared with the all-solid-state battery using the sulfide solid electrolyte according to the comparative example 1 because in the sulfide solid electrolytes according to the examples 1 and 2, the amounts of the elemental S could be reduced more than that according to the comparative example 1.

What is claimed is:
1. A method of producing a sulfide solid electrolyte, the method comprising:
heat-treating a sulfide solid electrolyte at a temperature no less than a melting point of elemental sulfur and equal to or over a crystallization temperature of the sulfide solid electrolyte while vibrating the sulfide solid electrolyte to obtain a sulfide solid electrolyte of glass ceramic, wherein the heat-treating while vibrating is carried out under a reduced pressure of an inert gas or in a presence of a gas flow, wherein a vibration frequency of the vibrating is 10 to 1000 Hz and an amplitude of the vibrating is 1 to 10 mm, and wherein a time of the heat-treating is no less than 10 minutes and no more than 4.5 hours.

2. The method of producing a sulfide solid electrolyte according to claim 1, wherein the sulfide solid electrolyte is synthesized from raw materials for an electrolyte, the raw materials containing at least $Li_2S$, and one or more sulfide(s) selected from $P_2S_3$, $P_2S_5$, $SiS_2$, $GeS_2$, $B_2S_3$ and $Al_2S_3$.

3. The method of producing a sulfide solid electrolyte according to claim 2, wherein the raw materials for an electrolyte contain at least $Li_2S$ and $P_2S_5$.

4. The method of producing a sulfide solid electrolyte according to claim 1, the method further comprising:

prior to the heat-treating while vibrating, pulverizing the sulfide solid electrolyte.

5. The method of producing a sulfide solid electrolyte according to claim 1, wherein the heat-treating while vibrating is sufficient to fluidize the sulfide solid electrolyte.

* * * * *